US012591735B1

(12) United States Patent (10) Patent No.: US 12,591,735 B1
Venables et al. (45) Date of Patent: Mar. 31, 2026

(54) TRANSACTION DATA CONVERSION TO DYNAMIC TRANSACTION TRANSCRIPT

(71) Applicant: SymmetriCall Inc., Miami, FL (US)

(72) Inventors: Kenneth Chad Venables, Las Vegas, NV (US); Scott David Hazard, Pinecrest, FL (US)

(73) Assignee: SymmetriCall Inc., Miami, FL (US)

( * ) Notice: Subject to any disclaimer, the term of this patent is extended or adjusted under 35 U.S.C. 154(b) by 0 days.

(21) Appl. No.: 19/253,214

(22) Filed: Jun. 27, 2025

Related U.S. Application Data

(60) Provisional application No. 63/773,990, filed on Mar. 18, 2025.

(51) Int. Cl.
| | |
|---|---|
| *G10L 15/26* | (2006.01) |
| *G06F 40/103* | (2020.01) |
| *G06F 40/166* | (2020.01) |
| *G06Q 30/015* | (2023.01) |
| *G06T 11/60* | (2006.01) |

(52) U.S. Cl.
CPC .......... *G06F 40/166* (2020.01); *G06F 40/103* (2020.01); *G06Q 30/015* (2023.01); *G06T 11/60* (2013.01); *G06T 2210/32* (2013.01)

(58) Field of Classification Search
CPC ... G06F 40/166; G06F 40/103; G06Q 30/015; G06T 11/60; G06T 2210/32
See application file for complete search history.

(56) References Cited

U.S. PATENT DOCUMENTS

| | | | | |
|---|---|---|---|---|
| 8,972,269 | B2 * | 3/2015 | Hoeg | G06F 40/166 |
| | | | | 704/235 |
| 9,454,518 | B1 * | 9/2016 | Grimm | G06Q 50/18 |
| 10,318,586 | B1 | 6/2019 | Rose et al. | |
| 11,508,411 | B2 * | 11/2022 | Allibhai | G11B 27/36 |
| 11,984,114 | B2 | 5/2024 | Bekker et al. | |
| 12,205,577 | B1 | 1/2025 | Kim et al. | |
| 2017/0336960 | A1 * | 11/2017 | Chaudhri | G06F 3/04883 |
| 2018/0260834 | A1 | 9/2018 | Stuckey et al. | |
| 2019/0295545 | A1 | 9/2019 | Andreas et al. | |
| 2020/0034033 | A1 * | 1/2020 | Chaudhri | G06F 3/04817 |
| 2022/0130421 | A1 * | 4/2022 | Allibhai | G06F 3/04842 |

(Continued)

FOREIGN PATENT DOCUMENTS

WO      WO-2025106596 A1 *   5/2025   ........... G06N 3/0475

OTHER PUBLICATIONS

"The Open Graph protocol", downloaded from https://ogp.me/, undated, 7 pages total.

(Continued)

*Primary Examiner* — Hassan Mrabi
(74) *Attorney, Agent, or Firm* — Womble Bond Dickinson (US) LLP

(57) ABSTRACT
A request for an interactive communication is received from a first user device of a first user, where the first user device is among one or more user devices and the first user is among one or more users. In response to the request, communication information associated with the interactive communication is obtained. A digital transcript is generated based on the communication information, where the digital transcript comprises the communication information. A web resource identifier that identifies the digital transcript is generated. The web resource identifier is sent to the user device(s).

20 Claims, 11 Drawing Sheets

(56) References Cited

U.S. PATENT DOCUMENTS

| 2022/0188504 | A1* | 6/2022 | Singh | G06F 40/186 |
| 2022/0215841 | A1* | 7/2022 | Zhao | G10L 15/30 |
| 2023/0197064 | A1 | 6/2023 | Bekker et al. | |
| 2024/0129148 | A1* | 4/2024 | Clegg | G06F 40/35 |
| 2024/0232765 | A1* | 7/2024 | Austraat | G06F 40/30 |
| 2024/0249318 | A1 | 7/2024 | Spiegel et al. | |
| 2024/0265420 | A1 | 8/2024 | Glazier et al. | |
| 2024/0296606 | A1 | 9/2024 | Smetanin et al. | |
| 2025/0005281 | A1 | 1/2025 | Yuan et al. | |
| 2025/0036675 | A1* | 1/2025 | Goshen | G06F 16/345 |
| 2025/0157103 | A1* | 5/2025 | Inkpen | G06T 11/60 |

OTHER PUBLICATIONS

Ivan Herman et al., "W3C Working Group Note, RDFa 1.1 Primer—Third Edition, Rich Structured Data Markup for Web Documents, W3C Working Group Note Mar. 17, 2015", downloaded from https://www.w3.org/TR/rdfa-primer/, 2010-2015, 25 pages total.
Aaron Francis, "Dynamically Generating Thousands of OG Images for a Viral Twitter Campaign", downloaded from https://www.netlify.com/blog/dynamically-generate-open-graph-image-variants/, Nov. 21, 2022, 19 pages total.
"Linked Data in HTML", downloaded from https://rdfa.info/, undated, 2 pages total.

* cited by examiner

You have reached XXXEnergy. Please select from the following options so we can best direct your call.

1. Accounts
2. Outage in your area
3. New service
4. Speak with an agent

1

1. Pay outstanding balance
2. Close your account
3. Speak with account manager

3

You are connected to James

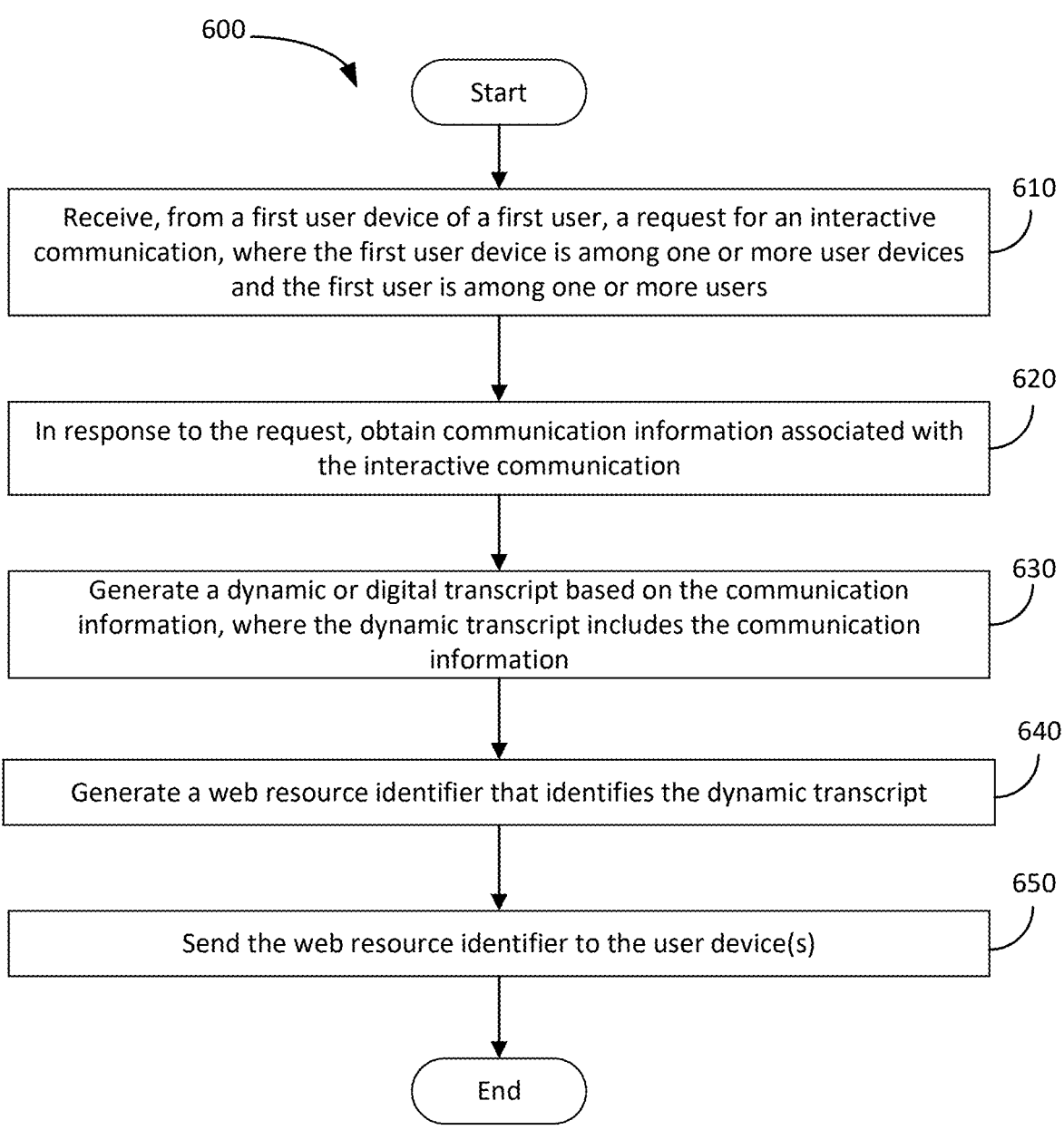

600

Start

610
Receive, from a first user device of a first user, a request for an interactive communication, where the first user device is among one or more user devices and the first user is among one or more users

620
In response to the request, obtain communication information associated with the interactive communication

630
Generate a dynamic or digital transcript based on the communication information, where the dynamic transcript includes the communication information

640
Generate a web resource identifier that identifies the dynamic transcript

650
Send the web resource identifier to the user device(s)

End

*FIG. 6*

TRANSACTION DATA CONVERSION TO DYNAMIC TRANSACTION TRANSCRIPT

CROSS-REFERENCE TO RELATED APPLICATIONS

This application claims the benefit of U.S. Provisional Application No. 63/773,990 filed on Mar. 18, 2025, the disclosure of which is incorporated herein by reference. This application is also related to U.S. patent application Ser. No. 19/253,280 filed on Jun. 27, 2025, titled "GENERATION OF COMMUNICATION RECEIPT FOR A DYNAMIC TRANSCRIPT OF AN INTERACTIVE COMMUNICATION".

TECHNICAL FIELD

This application generally relates to interactive communication systems. More specifically, embodiments of the application relate to generating a dynamic transcript of interactive communication between user devices.

BACKGROUND

Interactive communication systems with automated prompts are commonly used to automate voice communications (e.g., phone calls), or other interactions, such as text messaging, video (visual) calls, video conferencing, etc. However, they can leave users frustrated for several reasons. For instance, existing interactive communication systems generally do not provide adequate solutions during a single communication (e.g., phone call). Users must start a new communication, interaction or transaction if they need to follow up on a specific matter. Therefore, there is a need to improve as to how users interact with interactive communication systems during and after the communication.

BRIEF DESCRIPTION OF THE DRAWINGS

FIG. 6 is a flow diagram illustrating a process for an interactive communication according to an embodiment.

DETAILED DESCRIPTION

Figure 1:
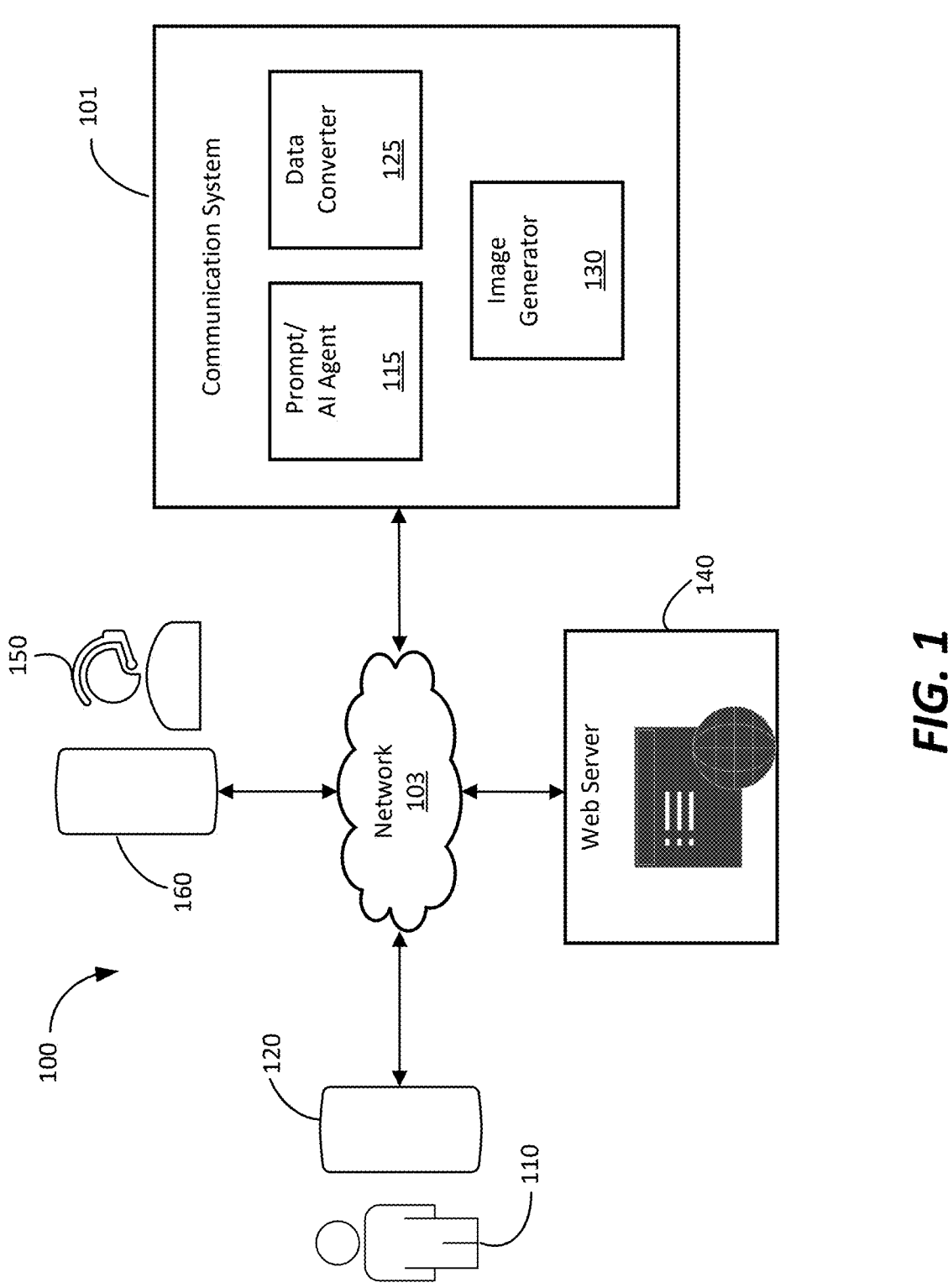
FIG. 1 is a block diagram illustrating an example interactive communication system that generates a dynamic transcript for an interactive communication according to an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

According to some embodiments, system and method for creating a dynamic transcript of a transaction involving an interactive communication, such as a voice communication (e.g., phone call), mobile messaging (e.g., Short Message Service (SMS), Multimedia Messaging Service (MMS), etc.), video or visual calls, video conferencing, etc., are provided. The dynamic transcript described herein may be a digital transcript of an interactive communication or transaction that can be personalized, and automatically or manually updated during or after the interactive communication. The dynamic transcript may include detailed information of one or more communications associated with a user (e.g., customer). The dynamic transcript can be searchable and trackable and includes relevant information about the transaction or communication. In an embodiment, a visual representation of a web resource identifier (may also be referred to as link preview) referencing the dynamic transcript is generated. The transcript may be uploaded onto a website in real time. The dynamic transcript may be shared with the parties involved in the interactive communication, for example, using the web resource identifier (e.g., Uniform Resource Identifier (URI) or Uniform Resource Locator (URL)) referencing the dynamic transcript on a web server. In an embodiment, the visual representation of the web resource identifier referencing the dynamic transcript can be rendered on the participants' devices. In an embodiment, the visual representation may be an image that includes textual summary of the dynamic transcript, and can be rendered using, for example, the Open Graph (OG) protocol. The visual presentation may serve as a communication receipt that confirms or evidences the communication. The visual representation may be dynamic (e.g., updated to reflect current communication information) or static. The participants can select or click on the visual representation to access the dynamic transcript, via a browser or an app, on the web server and continue or resume the transaction or communication by interacting with the web server in real time during or after the completion of the communication.

Method, one or more non-transitory computer readable storage media, and a server system for communication are provided. In an embodiment, a request for an interactive communication may be received from a first user device of a first user, where the first user device is among one or more user devices and the first user is among one or more users. In response to the request, communication information associated with the interactive communication may be obtained. A dynamic or digital transcript may be generated based on the communication information, where the dynamic or digital transcript comprises the communication information. A web resource identifier that identifies the dynamic transcript may be generated. The web resource identifier may be sent to the user device(s).

FIG. 1 is a block diagram illustrating an example interactive communication system that generates a dynamic transcript for an interactive communication according to an embodiment. Referring to FIG. 1, in one embodiment, system 100 includes, but is not limited to, a communication system 101, a user device 120, a user device 160, and a web server 140. User device 120 and user device 160 may be a computer system (such as a desktop computer, laptop computer, or server computer system), mobile device (e.g., mobile phone, tablet, smartphone, smartwatch, smart glasses, health (activity) tracker, etc.), gaming system, vehicle infotainment system, or a combination thereof. Communication system 101 may also be one or more computing devices, such as one or more server computer systems, desktop computer systems, etc.

The communication system 101, user device 120, web server 140, and user device 160 may be coupled to a network 103 and communicate with one another using any of the standard protocols for the exchange of information, including secure communication protocols. In one embodiment, the communication system 101, user device 120, web server 140, and user device 160 may run on one Local Area Network (LAN) and may be incorporated into the same physical or logical system, or different physical or logical systems. Alternatively, the communication system 101, user device 120, web server 140, and user device 160 may reside on different LANs, wide area networks, cellular telephone networks, etc. that may be coupled together via the Internet but separated by firewalls, routers, and/or other network devices. In one embodiment, communication system 101 may reside on a single server, or be distributed among different servers, coupled to other devices via a public network (e.g., the Internet) or a private network (e.g., LAN). It should be noted that various other network configurations can be used including hosted configurations, distributed configurations, centralized configurations, etc.

With continued reference to FIG. 1, user 110 may operate user device 120 to communicate with communication system 101. For instance, user device 120 can initiate an interactive communication or transaction by initiating a voice communication (e.g., phone call). User 110 can also start transactions or communications using a mobile messaging service (e.g., SMS, MMS, etc.) or other messaging platforms such as WhatsApp®, Telegram®, Skype®, Discord®, Viber®, Signal®, etc. In some embodiments, the communication can be started using web-based applications (apps), chat, or email. User 110 may use an app on user device 120 to start the communication. User device 120 can be a device with Internet connectivity with which user 110 can interact. In an embodiment, user device 120 may automatically start a communication without intervention of user 110. For example, the communication can be initiated when user device 120 detects a particular condition, such as a health condition like a fall or heart event, or the tracker detects a goal has been met.

In the example shown in FIG. 1, a single user 110 is shown, though many users 110 and user devices 120 may interact with system 100 (for example, in a conference call). In some embodiments, the communication initiated by user device 120 may involve a variety of communication topics. For example, the communication may include a communication associated with a business transaction or interaction, customer or product support, answering questions or concerns about products, product details, pricing or other information regarding business's offerings, troubleshooting issues, finding solutions, addressing user's questions or concerns, etc. In response to the initiation or request of the communication, communication system 101 may use automated prompts to extract relevant communication information associated with the communication. The information can be used to create a dynamic transcript of the communication. The dynamic transcript can be uploaded onto a web server 140 by communication system 101.

In an embodiment, web server 140 may be a system that delivers web pages and other content to user devices (e.g., user device 120) over the Internet. Web server 140 may be a static web server that delivers pre-existing files or content as they are, or web server 140 may be a dynamic web server that generates content on the fly using databases (not shown) and application logic. It is noted that while FIG. 1 shows the web server 140 as being separate from communication system 101, in some embodiments, web server 140 may be part of communication system 101.

In some embodiments, the dynamic transcript can be shared with user 110 via user device 120. User device 120 may communicate with web server 140 using a web resource identifier referencing the dynamic transcript. As previously described, the dynamic transcript may be shared with the parties involved in the interactive communication, for example, using a web resource identifier (e.g., URI or URL) that references the dynamic transcript on a web server. Based on the web resource identifier, user device 120 can render and display a visual representation of the web resource identifier on the user device 120. The visual representation may be an image that includes textual summary of the dynamic transcript, and can be rendered using, for example, the OG protocol. The visual representation of the web resource identifier can be used to add information or details to the dynamic transcript in real-time or after the completion of the communication.

In an embodiment, at least one human or representative 150 (who may represent a business) may participate in the communication via another user device 160. Representative 150 (another user) may be an employee of the business or an agent of the business, such as a call center agent, customer representative, customer support representative, customer service representative or agent, sales representative, technical support representative, etc., and refers to a human as opposed to an artificial intelligent (AI) agent and acts on behalf of the business that the user 110 is communicating with.

In an embodiment, representative 150 may communicate directly with user 110, via user device 160, to extract information of the communication and update communication system 101 to generate a dynamic transcript. User device 160 may extract the information by directly inquiring or communicating with user device 120 and updating this information on communication system 101. The dynamic transcript may include information about the communication, such as transaction parties or names of participants in the communication, a purpose of the communication, date and time of the communication, etc. It is noted that while one representative 150 and one user device 160 are shown in FIG. 1, in some embodiments, many representatives 150 and user devices 160 may be part of system 100 to communicate with user 110, via user device 120, and/or communication system 101.

User device 120, user device 160, or communication system 101 can update the dynamic transcript via the web server 140 in real-time or after the transaction through an app or web browser. For example, user 110, in real-time, may add product details, such as model numbers, serial numbers, pictures, or videos, using user device 120. User 110 can add sensitive information, such as passwords, passcodes, social security numbers, etc., to identify or authenticate themselves securely in real-time. Similarly, representative 150, via user device 160, or communication system 101 may add product information, such as manuals, pictures, videos, etc., to aid user 110 in real time. Representative 150 or communication system 101 may add information relevant to the communication, such as product shipment, refund of funds, etc., after (or during) the completion of the communication (e.g., phone call). In an embodiment, user 110 and representative 150 can access and update the dynamic transcript via user device 120 and user device 160, respectively, by selecting (e.g., clicking or tapping on) the web resource identifier sent to those user devices from communication system 101. Upon the selection, the dynamic transcript may be launched or accessed in a web browser or an app running on user devices 120 and 160, where user 110 and representative 150 can respectively modify or update the dynamic transcript.

In an embodiment, communication system 101 can keep track of any modifications made to the dynamic transcript. For example, as previously described, the dynamic transcript may serve as a digital transcript that includes numerous information, such as information about the communication, product information, shipment information and/or other type of information associated with the communication (described herein below). This information may be continuously obtained or collected during and/or after the communication, and may be added to or modified in the dynamic transcript. The dynamic transcript (with the added or modified information, which may be referred to as historical information) may be stored on the communication system 101 and/or web server 140 (e.g., in one or more databases) for subsequent access. When the dynamic transcript is accessed, for example, by user 110 and/or representative 150 selecting its associated web resource identifier, the dynamic transcript (with the up-to-date or historical information) may be retrieved from the database(s) and provided to the user 110, e.g., via a web app running on the user device 120 and/or user device 160, so that user 110 and/or representative 150 can initiate and resume from the previous communication without losing track of the information accumulated from one or more previous communications. Again, as this new communication (e.g., phone call) progresses, additional information about the communication may be obtained and added to (or modified in) the dynamic transcript. Therefore, information in the dynamic transcript may continue to accumulate depending on the number of communications made by user 110 and/or representative 150. Accordingly, the dynamic transcript provides complete operational transparency for user 110 and representative 150 throughout the various communications.

Communication system 101 can share an updated dynamic transcript with the participants of the communication if required or requested. For example, communication system 101 can share the updated dynamic transcript by sending another web resource identifier (e.g., URI or URL) that references the updated dynamic transcript to user device 120 and/or user device 160 using messaging services (e.g., SMS, MMS, etc.), email, etc. Alternatively, the updated transcript can be accessed using the initial web resource identifier shared with the participants. Again, based on the web resource identifier, user device 120 and/or user device 160 can respectively render and display another visual representation of the web resource identifier on the user device 120 and/or user device 160. In an embodiment, communication system 101 may confirm with user 110 as to which user device the user 110 wants to receive the dynamic transcript (or web resource identifier referencing the dynamic transcript). User 110 may choose to receive the dynamic transcript (or web resource identifier) on the user device used to start the communication (e.g., user device 120) or choose to provide user device information (e.g., phone number, email address, etc.) associated with a different user device. It is noted that while one user device 120 is shown in FIG. 1, in some embodiments, user 110 may be associated with a variety of user devices 120. For example, user 110 may initiate an interactive communication, e.g., voice communication such as a phone call, on a first user device 120 and may choose to receive the dynamic transcript on a second user device (not shown). In an embodiment, during an interactive communication involving multiple users (e.g., conference call), the dynamic transcript can be updated to add meeting information, such as agenda items, action items, reminders, etc., in real-time (or after the communication) by communication system 101, user device 120, or user device 160. In an embodiment, information about user 110 accessing the dynamic transcript on user device 120 (e.g., viewing or opening the dynamic transcript) can be tracked and logged by communication system 101 via user device 120.

With continued reference to FIG. 1, communication system 101 includes, but is not limited to, a prompt/AI agent 115, data converter 125, and image generator 130. In an embodiment, prompt/AI agent 115 may include a text-to-voice converter and/or voice-to-text converter that provide user 110 with automated voice prompts. For example, prompt/AI agent 115 may request user 110 to provide information about the communication, which may include one or more names of user 110, a purpose of the communication (e.g., technical support, refund, cancel subscription, etc.), product information or details (e.g., product name, model number, serial number, etc.), etc. Prompt/AI agent 115 may request the communication information by requesting user 110 to provide the communication information using, e.g., voice inputs, keypad inputs, etc., to select options from a menu in an app on user device 120, etc. If user 110 or user device 120 was previously registered with communication system 101, communication system 101 may retrieve some or all of the communication information automatically. For instance, communication system 101 may automatically detect the name of user 110 based on a user identifier (ID) of user 110, such as a caller ID (e.g., phone number). Communication system 101 may detect the phone number of user device 120 and deduce that communication from user 110 is regarding a particular product. In this example, communication system 101 may provide a prompt (e.g., voice or text) to confirm whether the user 110 communicates regarding that particular product. For example, the prompt may include a message similar to "Hello User, I see you are calling from 123-456-7890. Are you calling regarding product XYZ?" If user 110 confirms and initiates the communication using an app on user device 120, communication system 101 can retrieve the user information from the app.

In an embodiment, data converter 125 is responsible for the conversion of the information about the communication generated during the interaction between user 110 and prompt/AI agent 115 into a human and machine readable (structured) format, such as a JavaScript Object Notation (JSON) or extensible markup language (XML) file, that can be used to generate a dynamic transcript. The format may allow for storing, sharing, appending information, searching, and/or tracking the information about the communication.

In an embodiment, image generator 130 may use the formatted data from data converter 125 to create a dynamic image. The dynamic image may be used to generate a visual representation (described in more detail herein below) of a web resource identifier referencing or identifying the dynamic transcript. The dynamic image may be formatted into a file format for storing and displaying vector graphics on the web, such as Scalable Vector Graphics (SVG) format. Scripts running on a virtual machine of communication system 101 can create a dynamic image. In another embodiment, the dynamic image is created using AI. AI models can generate images based on textual prompts. Other image formats, such as PNG, JPEG, OG (Open Graph), etc. can be used.

Figure 2A:
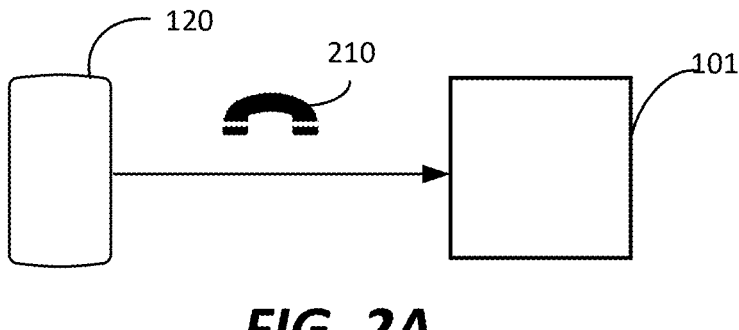
FIGS. 2A-2I are diagrams illustrating example communications between a user and an interactive communication system according to an embodiment.

FIGS. 2A-2I are diagrams illustrating example communications between a user and an interactive communication system according to an embodiment. Referring to FIG. 2A, user 110 (not shown in this figure) may initiate a communication, transaction, or interaction using device 120 by making, for example, a phone call 210. Other means of starting communication, such as messaging services (e.g., SMS, MMS, etc.), messaging platforms (e.g., WhatsApp®, Telegram®, Skype®, Discord®, Viber®, Signal®, etc.), emails, etc., can be used in some embodiments.

In an embodiment, communication system 101 may respond to this communication using automated prompts. Communication system 101 may inquire about the purpose of the call and determine that user 110 wants to speak with a human or customer service representative 150 (shown in FIG. 1). Communication system 101 may capture information about the communication (which may include the purpose of the call) and generate a dynamic transcript using the captured information. Communication system 101 may then upload the dynamic transcript onto web server 140 for subsequent access. In some embodiments, communication system 101 may ask whether user 110 wants to receive a dynamic transcript while waiting on the phone for a human agent or representative 150 to become available.

Figure 2B:
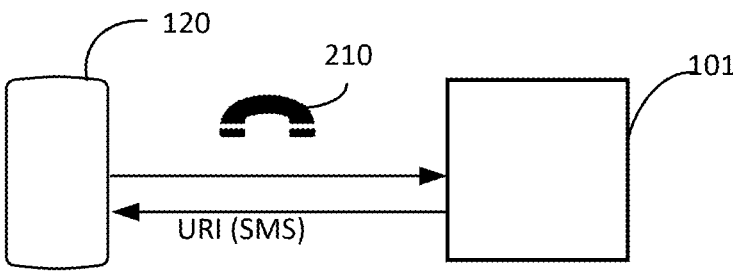

In FIG. 2B, communication system 101 may send a web resource identifier (e.g., URI or URL) referencing the dynamic transcript uploaded onto web server 140 using SMS in this example. Other means of communication, such as messaging services, messaging platforms, emails, etc., can be used in some embodiments.

Figure 2C:
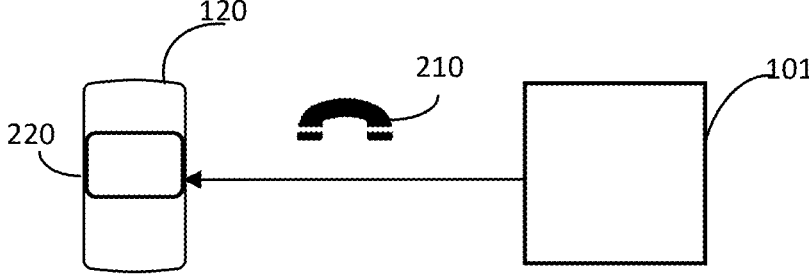

In FIG. 2C, the SMS is received by user device 120, where a visual representation 220 of the web resource identifier included in the SMS is rendered and displayed on user device 120. For example, using the received web resource identifier, user device 120 may access the linked or referenced dynamic transcript and fetch metadata associated with the dynamic transcript. The metadata may include information about one or more images (e.g., dynamic image) associated with the dynamic transcript. For example, the metadata may include a web resource identifier (e.g., URL) of the image to display in a share preview, e.g., when a user receives the web resource identifier that references the dynamic transcript. The image may be in any format supported by the OG protocol, such as JPG, PNG, etc. The image may include information about the communication, such as names of participants in the communication, a purpose of the communication, date and time of the communication, and/or any other relevant details such as how the communication was initiated (e.g., phone number(s) of participant(s), app, SMS, etc.). User device 120 may use the fetched metadata to create and display (render) visual representation 220 (e.g., the image and information about the communication) on user device 120. An example of visual representation 220 is illustrated in FIG. 2D.

Figure 2D:
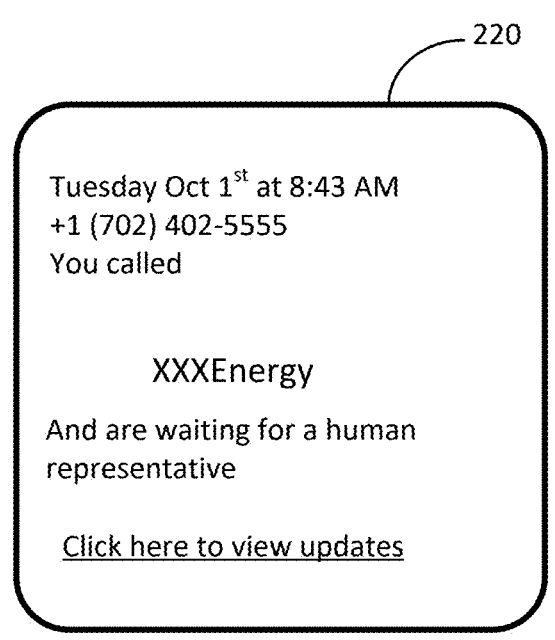

As shown in FIG. 2D, the visual representation 220 shows the date and time of the call, the party the user called (e.g., XXXenergy), and the current status or purpose of the communication. The visual representation 220 may include an additional message linking to the web resource identifier asking user 110 to click to view updates.

Figure 2E:
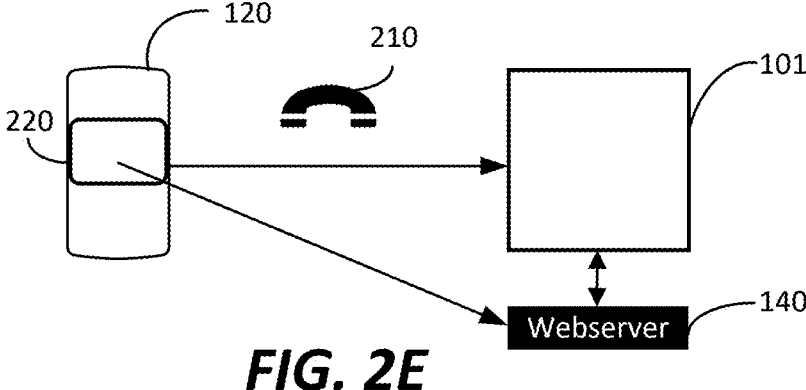
Figure 2F:
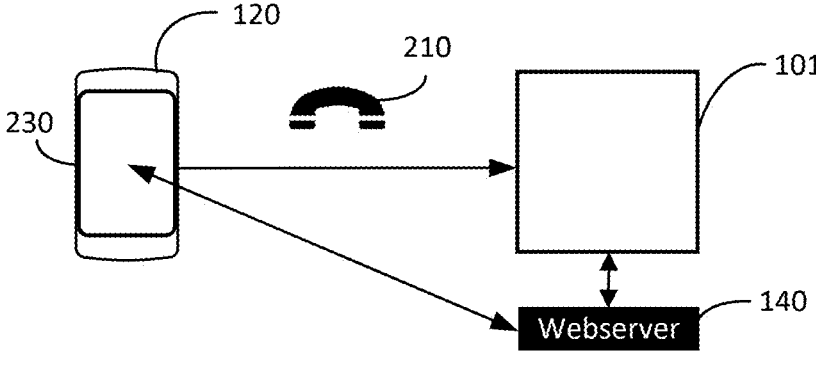

In FIG. 2E, user 110 selects (e.g., clicks or taps on) the visual representation 220. Upon selecting the message, the dynamic transcript that the web resource identifier referenced or identified can be accessed or retrieved on web server 140 using a web browser or app running on user device 120. In FIG. 2F, a web app 230, which may be a browser such as Safari®, Chrome®, or another application, running on user device 120 may display the dynamic transcript accessed or retrieved on web server 140. For example, the dynamic transcript may be displayed at a specific location on a user interface of web app 230.

Figure 2G:
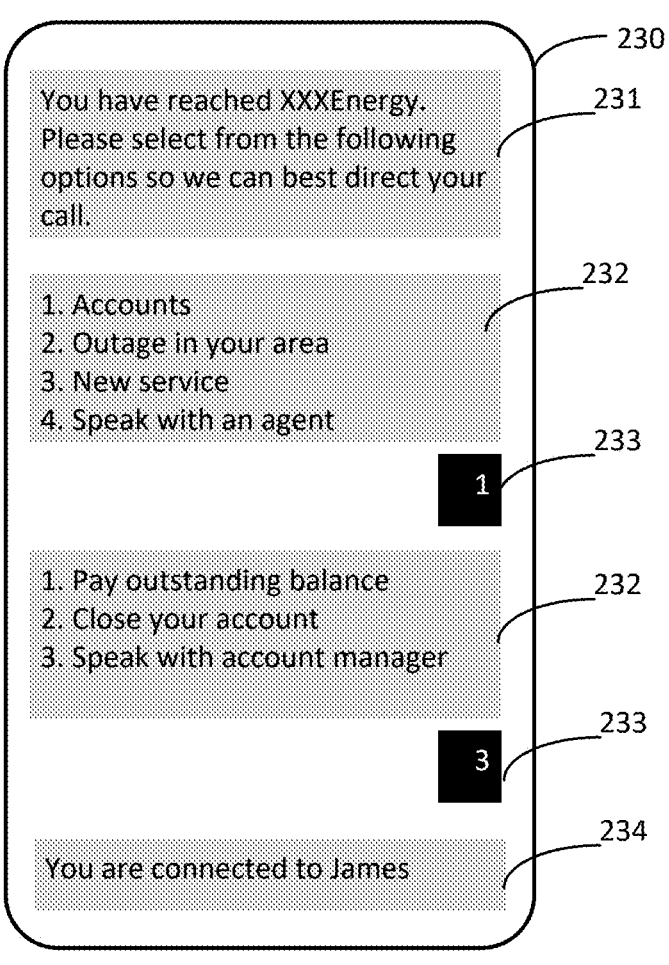

FIG. 2G shows an example dynamic transcript displayed in web app 230. In this example, the dynamic transcript is shown as a textual interface, but other embodiments using graphical user interface (GUI) elements, such as radio buttons, checkboxes, lists, dropdowns, autosuggestions, text fields, forms, natural language forms, etc., can be used to make interactions with user 110 more straightforward and more appealing. In FIG. 2G, the dynamic transcript may include one or more messages 231. Messages 231 may include communications inviting user 110 to interact or communicate with communication system 101 by selecting one or more options 232 from a menu. The options 232 may include dynamically updating the current wait times until a customer representative becomes available or other similar information. In this example, the dynamic transcript shows a menu of options 232 that invites user 110 to make a selection. User 110 may provide their selection by typing in this example. When a service representative becomes available and connects with user 110 via phone, as an example, a message 234 indicating the connection may be displayed.

Figure 2H:
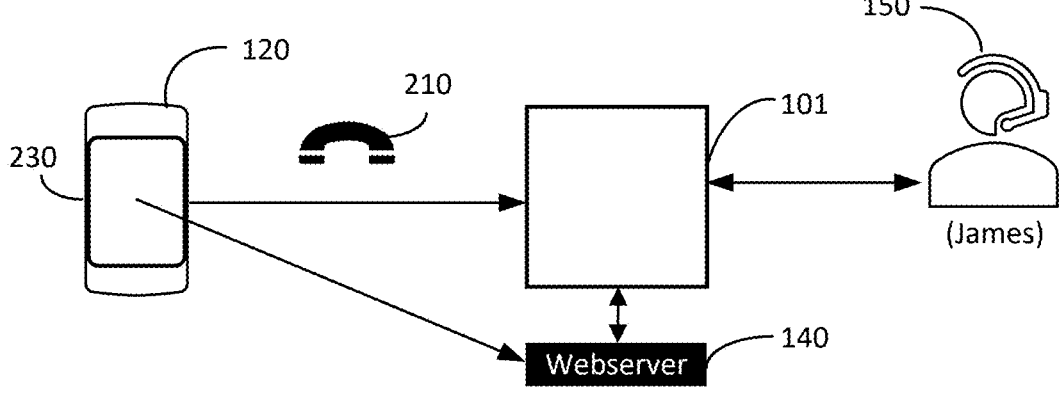
Figure 2I:
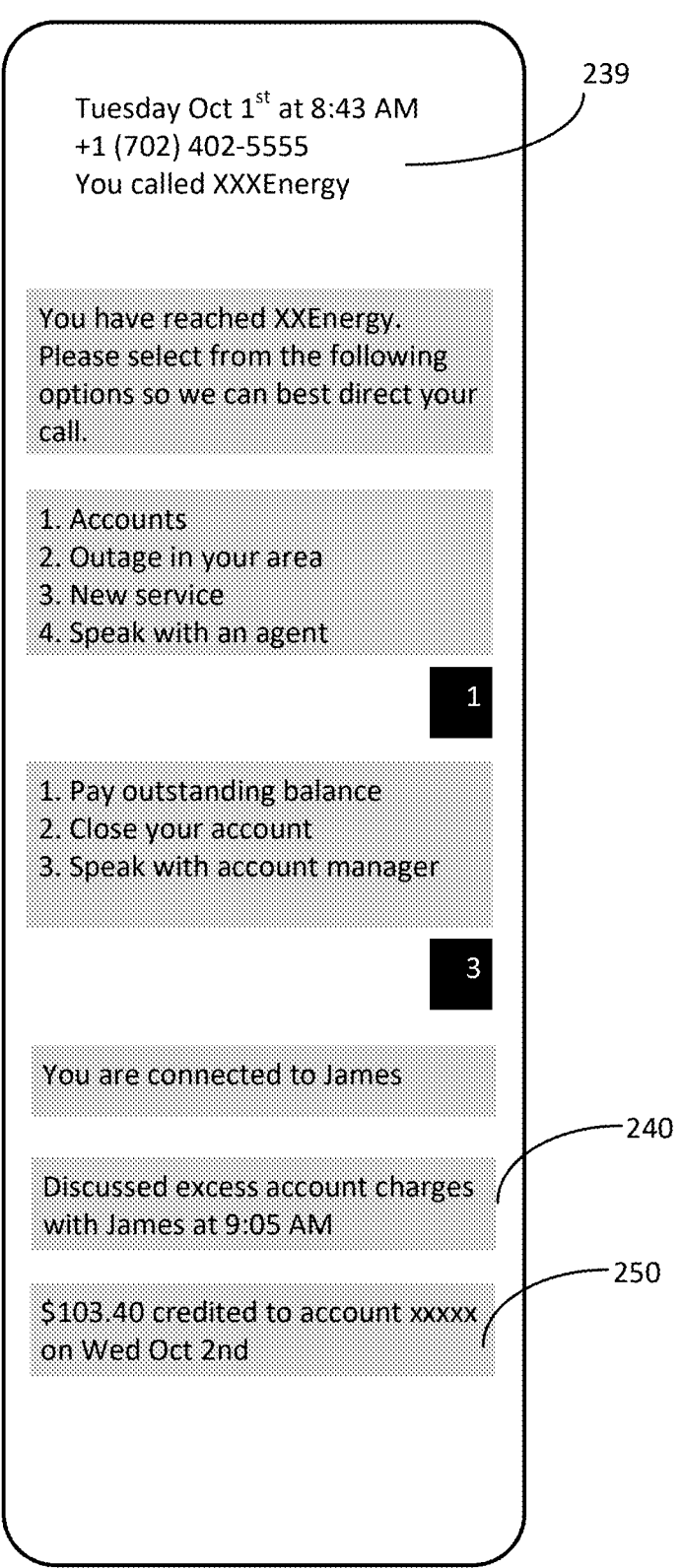

In FIG. 2H, customer representative 150 (e.g., James) joins user 110 on the phone. User 110 can continue his interactions or communications on both the phone and web app 230. FIG. 2I shows an example of the dynamic transcript on web server 140 after the completion of communication (e.g., phone call). In this example, after interacting with user 110, customer service representative 150 (or communication system 101) may update the dynamic transcript. In this example, a communication summary 240 that includes the purpose of the communication and a timestamp of the communication with representative 150 are added to the dynamic transcript. Updated information 250 (e.g., an amount credited to an account) of the communication (e.g., phone call) may also be added to the dynamic transcript by communication system 101 (or representative 150) after the completion of the phone call, where, in this example, the user is credited with a refund. Additional communication information 239, such as date and time of the call, the party the user called (e.g., XXXenergy), phone number of the party the user called, etc., may be added to dynamic transcript after the phone call. User 110 may click on the visual representation 220 (shown in FIG. 2D) anytime to access the updated dynamic transcript. The web resource identifier does not need to be resent to user device 120 by communication system 101 to access the updated dynamic transcript unless requested by user 120. The web app 230 running on user device 120 may include UI tools to allow user 110 to modify the dynamic transcript, so user 110 can edit transaction details, add new statuses, etc.

Figure 3:
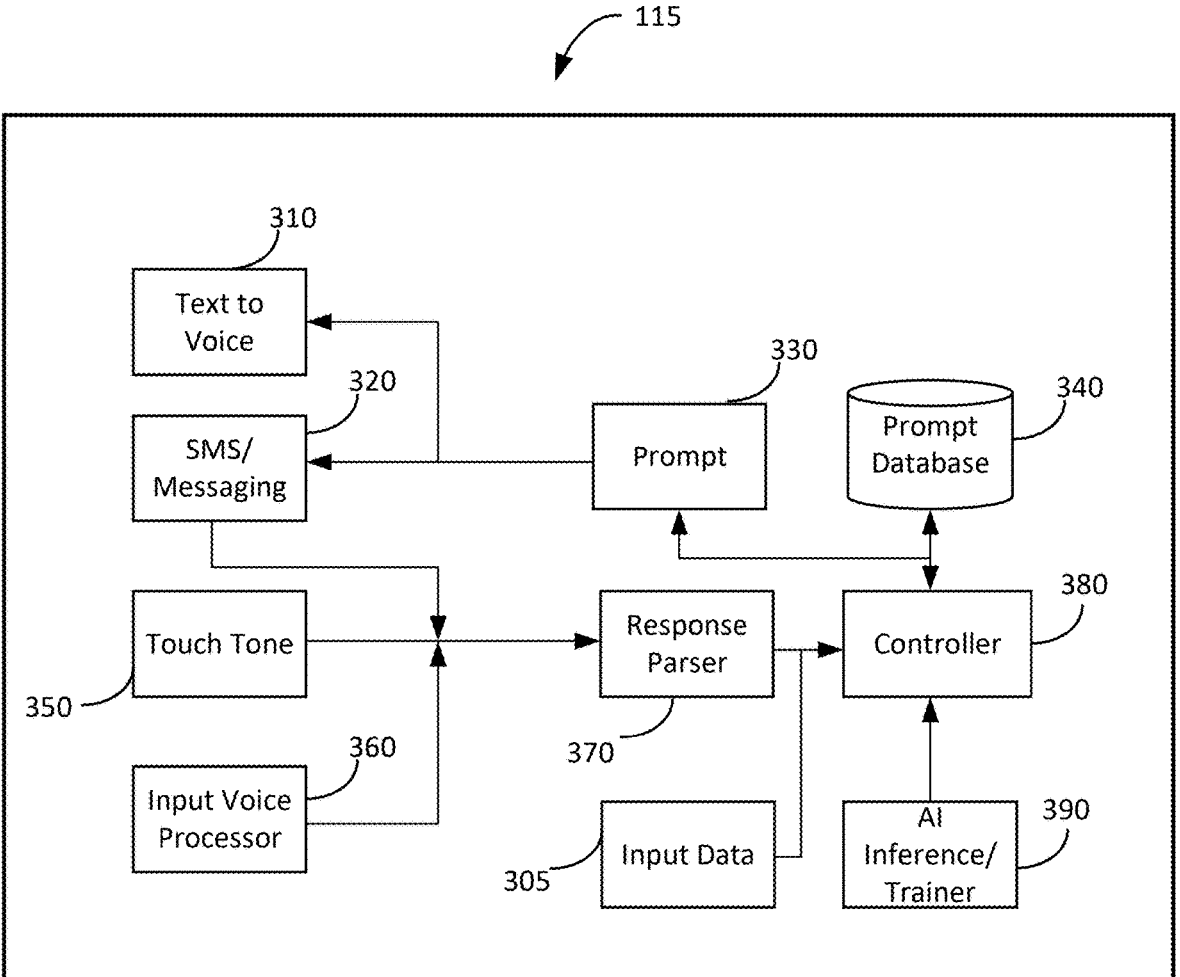
FIG. 3 is a block diagram illustrating a system architecture of a prompt/AI agent according to an embodiment.

FIG. 3 is a block diagram illustrating a system architecture of a prompt/AI agent according to an embodiment. As shown, prompt/AI agent 115 may include, but not be limited to, a text to voice (or speech) module or unit 310, SMS/messaging module 320, a prompt 330, a prompt database 340, a touch tone module 350, an input voice processor 360, a response parser 370, an AI/controller 380, and an AI inference/trainer 390.

Referring to FIG. 3, input data 305 may be provided to controller 380. Input data 305 may include communication information such as caller ID, name of a user (e.g., user 110 of FIG. 1), or other information (e.g., from an app running on a user device such as user device 120 of FIG. 1) provided to communication system 101. Representative 150 may also provide input information (e.g., product information as previously described), which may be part of input data 305.

In an embodiment, controller 380 may control the communication between communication system 101 and user 110 and is configured to elicit the information required to conduct the current communication. The required information varies based on the communication. For instance, if the communication involves a current account balance inquiry, controller 380 may require account information of user 110 for authentication. As another example, if the communication involves a shipment inquiry, controller 380 may require shipping information and/or other information associated with the shipment, such as the name of user 110, address of sender, address of recipient, purchase information, tracking information, etc. Controller 380 can be a simple event, response-driven software, and/or AI-based model.

In an embodiment, prompt database 340 may be a repository that stores instructions or prompts that gather relevant information regarding the communication, such as the information about the communication, account information, shipment information, etc. (as previously described). Prompt database 340 may organize the prompts into categories and/or add tags to the prompts in order to facilitate searching and filtering. In some embodiments, prompts 340 may be used with large language models (LLMs). Prompt database 340 can be customized or predefined based on business's needs.

In an embodiment, controller 380 may generate prompt 330 from database 340 based on currently available information (e.g., name of user, purpose of the communication, etc.) from user 110 for the communication. Using the available information, controller 380 may query prompt database 340 to obtain or retrieve prompt 330. The particular prompt 330 retrieved from database 340 may be dependent on the purpose of the communication, e.g., refund, product shipment, etc., as previously described. Prompt 330 may be provided to text-to-voice module 310 and/or SMS/messaging module 320. In some embodiments, prompt 330 may be a request, question, response, or instruction to elicit a specific response.

In an embodiment, text to voice module 310 may send a voice communication of the prompt 330 to a user device (e.g., user device 120 of FIG. 1), where the user can response to the prompt through the user device. SMS/messaging module 320 may send a text communication of prompt 330 to the user device. For example, SMS/messaging module 320 may format prompt 330 into a text format so that the prompt 330 can be sent to the user device using a messaging service, such as SMS, MMS, etc., or a messaging platform, e.g., WhatsApp, etc. SMS/messaging module 320 may also process user responses received from the user device (e.g., user device 120).

In an embodiment, prompt 330 may request a user (e.g., user 110) to provide a menu-based response (e.g., "press or say 1 for account balance" in the case of voice communication, or "Text 1 for account balance" in the case of text communication), a response in natural language (for instance, "tell me how I can help you," "what product are your calling about," etc.) or a directed dialogue response (for instance, "To hear your current balance, 'Say Balance'").

Touch tone module 350 and input voice processor 360 can also process inputs from the user. Touch tone 350 may be used when prompt/AI agent 115 prompts the user (e.g., user 110) to use the user device (e.g., keypad of the user device) to provide a response (e.g., numerical response). Response parser 370 may process the current response provided by the user. The response parser 370 may extract information associated with the current response by parsing voice responses (voice-to-text) from input voice processor 360 and/or keypad inputs from touch tone module 350.

In an embodiment, response parser 370 may use natural language parsers or analyzers (for example, AI-based) to extract certain information associated with the response (e.g., name of the user, purpose of the communication, product details, etc.). The information may be provided to controller 380 to generate a next prompt (e.g., response) to user 110. When controller 380 determines that it has sufficient information (e.g., name of user, purpose of the communication, etc.), controller 380 may hand off the information to data converter 125.

AI inference/trainer 390 may be used to continuously train controller 380, which may be an AI model in an embodiment. In an embodiment, AI trainer 390 may be used by controller 380 to generate prompt database 340 (e.g., a customized prompt database). In an embodiment, prompt/AI agent 115 may continuously listen to (or monitor) the communication between the user and communication system 101, and generate a summary of the communication in real time. This is useful for generating a summary and adding agenda items, action items, reminders, etc., during the communication (e.g., a conference call).

As previously described with respect to FIG. 1, data converter 125 of communication system 101 may convert the information generated during the communication between the user (e.g., user 110) with prompt/AI agent 115 into a human and machine readable (structured) format (e.g., XML, JSON, etc.) that can be used to generate a dynamic transcript. The format allows for storing, sharing, appending information, searching, and tracking the communication information.

In an embodiment, the dynamic transcript may be in an image format. For example, image generator 130 of communication system 101 may use the formatted data from data converter 125 to create a dynamic image. The dynamic image may be used to generate a visual representation of the web resource identifier referencing the dynamic transcript, as previously described. The dynamic image may be in SVG format in an embodiment. Scripts running on a virtual machine of communication system 101 can create a dynamic image. In another embodiment, the dynamic image can be created using AI. For example, AI models (e.g., LLM) or AI-powered tools (e.g., Copilot) can generate images based on textual prompts. Other image formats, such as PNG, JPEG, etc., can be used.

Figure 4:
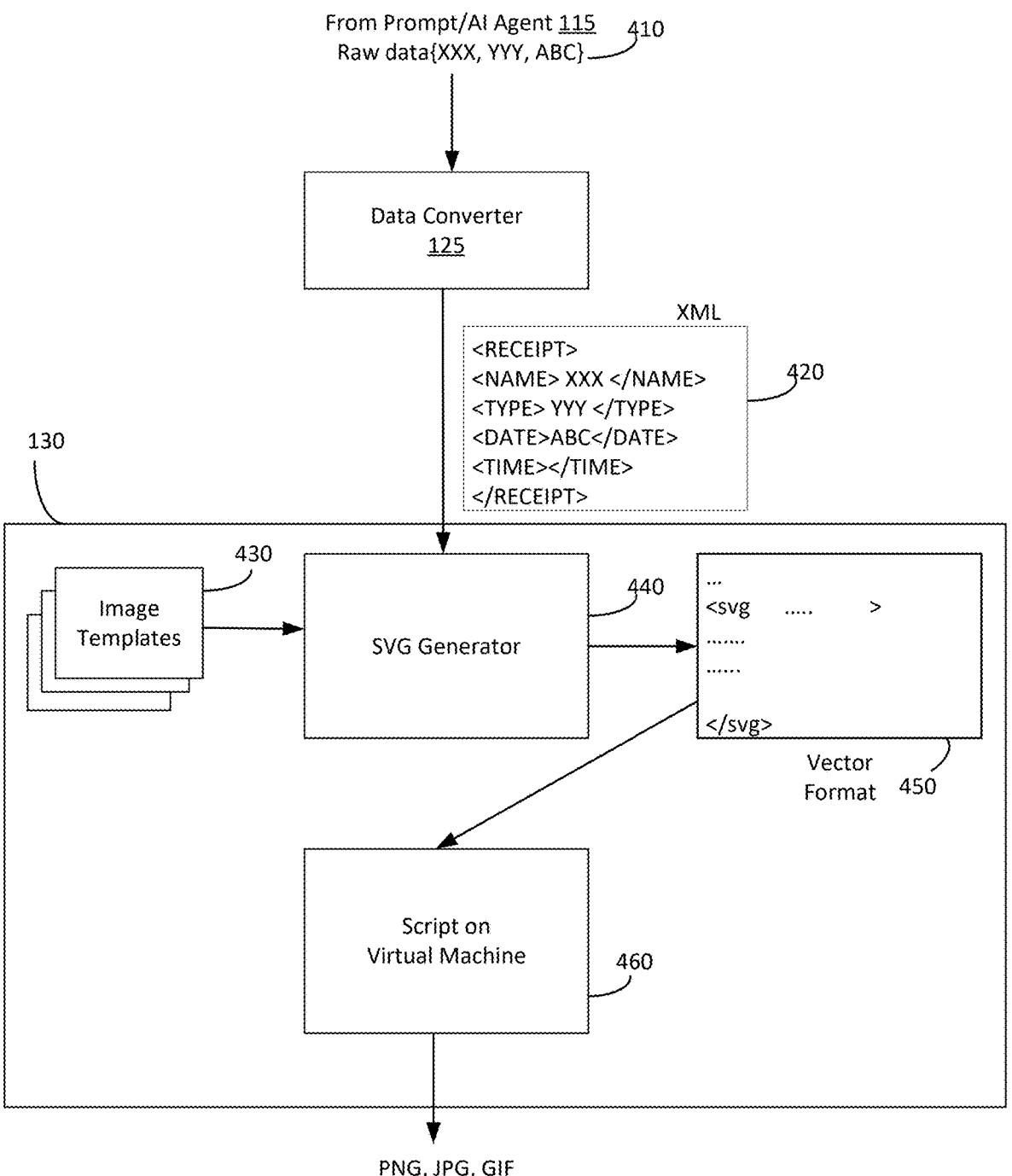
FIG. 4 is a block diagram illustrating a system architecture of a data converter communicating with an image generator according to an embodiment.

FIG. 4 is a block diagram illustrating a system architecture of a data converter communicating with an image generator according to an embodiment. Referring to FIG. 4, raw data 410 from AI/prompt agent 115 may be received. The raw data 410 may be shown as {XXX, YYY, ABC}. In this example, data converter 125 may take raw data 410 and format it into XML data or file 420. As shown, the raw data 410 may be divided into different XML attributes and placed in specific elements of the XML data 420. For example, in XML data 420, attribute "XXX" is placed in between the opening and closing "NAME" element tags, attribute "YYY" is placed in between the opening and closing "TYPE" element tags, and so on. XML data 420 may be provided to image generator 130. Image generator 130 may include one or more image templates 430 that can be used to generate an image. SVG generator 440 of image generator 130 may use image template 430 and XML data 420 to generate a vector image 450 in a vector image format (e.g., SVG format). Scripts running on virtual machine 460 may render vector image 450 on a headless browser (or other appropriate web browsers), and a snapshot of the rendered vector image may be taken to convert the image into an image format (e.g., PNG, JPEG, GIF, etc.). In some embodiments, the image format may be an OG supported format. The image may be uploaded onto a web server (e.g., web server 140 of FIG. 1).

As previously described, the dynamic transcript may be uploaded onto a web server (e.g., web server 140 of FIG. 1). A web resource identifier (e.g., URI or URL) referencing the dynamic transcript (uploaded onto the web server) may be shared with a user (e.g., user 110) via a user device (e.g., device 120). For example, messages sent through a messaging service (e.g., SMS, MMS, etc.), a messaging platform (e.g., WhatsApp, Signal, etc.), or a push notification to an app or user device may be used to share the web resource identifier. A visual representation of the web resource identifier may be rendered on the user device. Based on the user device's software capabilities, the dynamic transcript may be updated every time the user views the dynamic transcript or on a periodic basis. In an embodiment, communication system 101 may generate a push notification to force an update of the visual representation rendered on the user device. This allows the user to have up-to-date information on the communication in real time (i.e., real-time updates).

Figure 5:
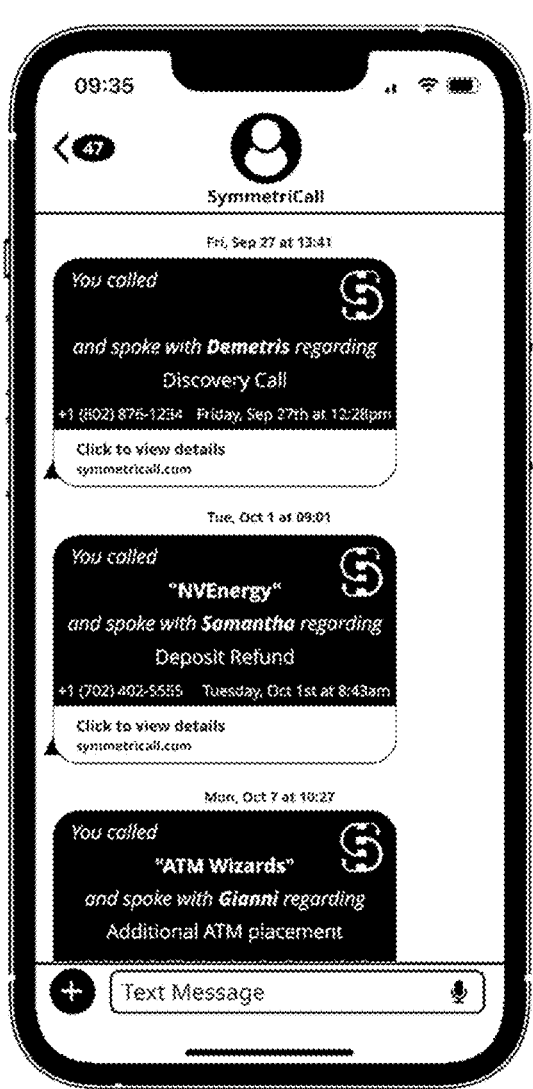
FIG. 5 is a diagram illustrating example visual representations of web links displayed on a user device according to an embodiment.

FIG. 5 is a diagram illustrating example visual representations of web links or web resource identifiers displayed on a user device according to an embodiment. In FIG. 5, three image representations of web resource identifiers referencing different dynamic transcripts are shown as rendered by user device 120's messages app. In this example, the visual representations may be images supported by the OG protocol (e.g., JPG, PNG, etc.).

In FIG. 5, each visual representation shows a communication summary that includes a type of communication (e.g., a phone call), name(s) of participant(s) (which may be representative 150 of FIG. 1), company or business name if applicable, the purpose of the communication (e.g., Discovery Call, Deposit Refunded, Additional ATM placement), phone number, date and time of the communication, and a text message instructing the user (e.g., user 110) to select (e.g., click or tap on) the visual representation to view additional details. Upon selecting (e.g., clicking or tapping on) the rendered visual representation, the user, via the user device, may access the dynamic transcript on a web server (e.g., web server 140). The user may update the dynamic transcript in real-time or after the completion of the communication using a web app (e.g., web app 230). The user can search (e.g., using a search bar of a messaging app) for a particular communication on the user device or by accessing the web server. The search can be based on the date of the communication, time of the communication, participants involved, reason or purpose of the communication, product involved, etc. In one embodiment, the visual representation may be dynamic where the communication summary may be automatically updated to reflect a current communication. In another embodiment, the visual representation may be static. As previously described, the visual representation may serve as a communication receipt confirming or evidencing the communication. Therefore, the visual representations provide the flexibility for a user (e.g., business owner, business manager, customer, property manager, etc.) to manage and retrieve communications (e.g., phone calls), and create an organized, positive experience for communications among different parties. It is noted that while three visual representations are illustrated in FIG. 5, any number of visual representations may be rendered or displayed on the user device.

FIG. 6 is a flow diagram illustrating a process for an interactive communication according to an embodiment. Method 600 may be performed by processing logic that may comprise hardware (circuitry, dedicated logic, etc.), software (such as is run on a general purpose computer system or a dedicated machine), firmware, or a combination. In one embodiment, the method 600 is performed by communication system 101 of FIG. 1 (e.g., prompt/AI agent 115, data converter 125 and/or image generator 130).

Referring to FIG. 6, at block 610, the processing logic may receive, from a first user device of a first user, a request for an interactive communication, where the first user device is among one or more user devices (e.g., devices 120, 160) and the first user (e.g., user 110) is among one or more users (e.g., user 110 and representative 150). At block 620, in response to the request, the processing logic may obtain communication information associated with the interactive communication. At block 630, the processing logic may generate a dynamic transcript based on the communication information, where the dynamic transcript includes the communication information. At block 640, the processing logic may generate a web resource identifier (e.g., URI or URL)

that identifies the dynamic transcript. At block 650, the processing logic may send the web resource identifier to the user device(s).

Figure 7:
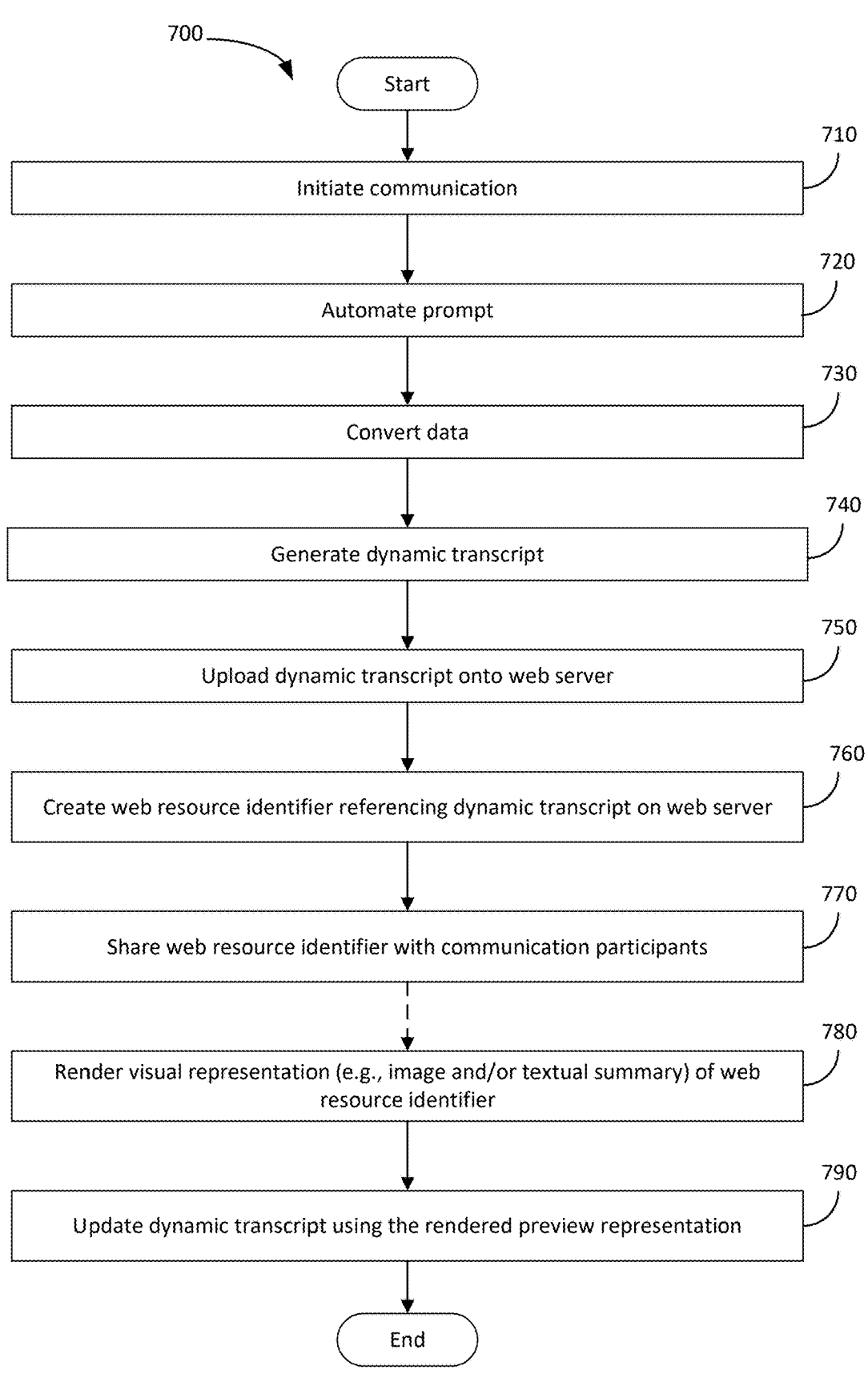
FIG. 7 is a flow diagram illustrating a process of generating a dynamic transaction transcript according to an embodiment.

FIG. 7 is a flow diagram illustrating a process of generating a dynamic transcript according to an embodiment. Method 700 may be performed by processing logic that may comprise hardware (circuitry, dedicated logic, etc.), software (such as is run on a general purpose computer system or a dedicated machine), firmware, or a combination. In one embodiment, the method 700 is performed by communication system 101 of FIG. 1 (e.g., prompt/AI agent 115, data converter 125 and/or image generator 130), user device 120, and/or user device 160.

Referring FIG. 7, at block 710, an interactive communication is initiated by a user (e.g., user 110) using a user device (e.g., device 120). The user can initiate the communication via a voice communication (e.g., phone call). The user can also start the communication using a mobile messaging service (e.g., SMS, MMS, etc.) or other messaging platforms such as WhatsApp® Telegram®, Skype®, Discord®, Viber®, Signal®, etc. In some embodiments, the communication can be started using web-based applications (apps), chat, or email. The user may use an app running on the user device to start the communication.

At block 720, a prompt is automated and provided to obtain or extract relevant information of the communication. For example, an AI/prompt agent (e.g., AI/prompt agent 115) may generate voice or textual prompts on the user device of the user. The prompts may ask the user to select an answer based on a menu of selections provided by the prompts. The user may answer using voice or keypad in case of a phone call. In case of textual interaction, the user 110 can type the answer to the prompts (e.g., enter text into a text input field of the dynamic transcript). If the user or user device has been previously registered with communication system 101, communication system 101 can automatically obtain relevant communication information, such as name of the user, the purpose of the communication, and other information, such as product name, etc. Communication system 101 may deduce the information when the user initiates the communication using an app running on the user device.

At block 730, the communication information may be converted into a human and machine readable (structured) format (e.g., XML, JSON, etc.) that can be used to generate a dynamic transcript. The format allows storing, sharing, appending information, searching, and tracking the communication information.

At block 740, the dynamic transcript may be created or generated based on the converted communication information. As previously described, the converted communication information may also be used to create a dynamic image. The dynamic image may be used to generate a visual representation of a web resource identifier that references or identifies the dynamic transcript. The dynamic image may be in a vector format (e.g., SVG format) in an embodiment. Scripts running on a virtual machine of communication system 101 can create the dynamic image. In another embodiment, the dynamic image can be created using AI. For example, AI models (e.g., LLM) or AI-powered tools (e.g., Copilot) can generate images based on textual prompts. Other image formats, such as PNG, JPEG, etc., can be used.

At block 750, the dynamic transcript and/or dynamic image may be uploaded onto a web server (e.g., web server 140). The dynamic transcript can be updated in real-time by a user (e.g., user 110, a communication system (e.g., system

101), or a representative (e.g., representative 150). Alternatively, the dynamic transcript can be updated after the completion of the communication.

At block 760, a web resource identifier (e.g., URI or URL) may be created. The web resource identifier may identify the dynamic transcript on the web server. At block 770, the web resource identifier may be shared with the participants (users, representatives) of the communication. For example, the web resource identifier may be sent to an app running on a user device via a messaging service (e.g., SMS, MMS, etc.), a messaging platform (e.g., WhatsApp, Signal, etc.), or a push notification.

At block 780, a visual representation of the web resource identifier (e.g., link preview) may be rendered on the user device of the user (e.g., user device 120). For example, the user device may access the linked or referenced dynamic transcript, which may be through a webpage, that the web resource identifier leads to, and fetch metadata (e.g., OG tags) associated with the dynamic transcript. The metadata may include information about an image associated with the dynamic transcript. For example, the metadata may include a web resource identifier (e.g., URL) of the image to display in a share preview, e.g., when a user receives the web resource identifier that references the dynamic transcript. The image may be in any format supported by the OG protocol, such as JPG, PNG, etc. The image may include information about the communication, such as names of participants in the communication, a purpose of the communication, date and time of the communication, phone number(s) of participant(s), etc. The user device may use the fetched metadata to create and display (render) a visual representation alongside the web resource identifier.

Based on the user device's software capabilities, the visual representation may be updated every time the user accesses the dynamic transcript, for example, by selecting the visual representation. Alternatively, the visual representation may be updated on a periodic basis. In an embodiment, a "push" notification be generated to force an update of the visual representation displayed on the user device. This allows the user to have up-to-date information on the communication (i.e., real-time updates). In some embodiments, dynamic images may be used for rendering of the visual representation. In an embodiment, the dynamic images may be in OG supported format.

At block 790, the dynamic transcript can be updated using the visual representation. For example, the user or representative can select (e.g., click or tap on) the rendered visual representation, which takes the user to the dynamic transcript hosting on the web server. As previously described, the dynamic transcript may be displayed on a user interface of a web app (e.g., web app 230). The user (or representative) can update the dynamic transcript in real time, or the user (or representative) can update the dynamic transcript after the communication is completed.

Figure 8:
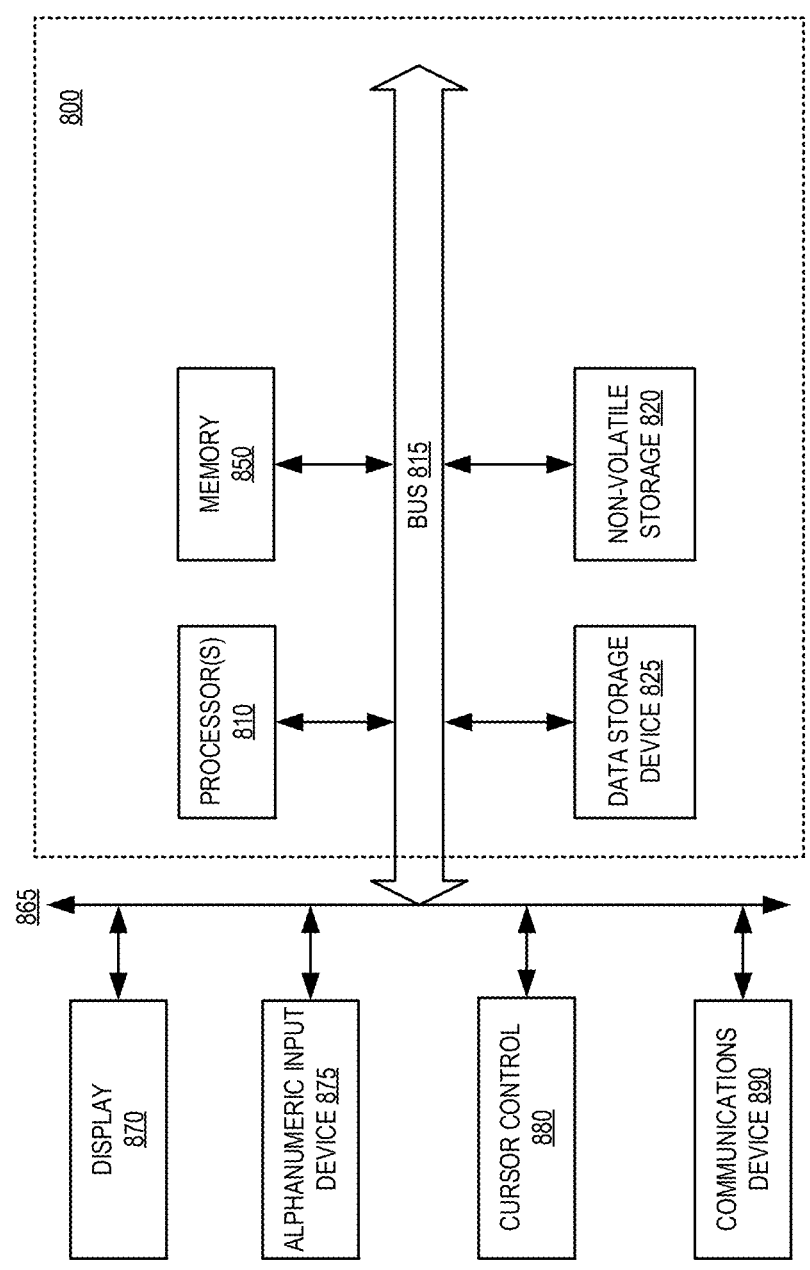
FIG. 8 is an embodiment of a computer system that may be used to support the systems and operations discussed herein.

FIG. 8 is an embodiment of a computer system that may be used to support the systems and operations discussed herein. The data processing system illustrated in FIG. 8 includes a bus or other internal communication means 815 for communicating information, and one or more processors 810 coupled to the bus 815 for processing information. The system further comprises a random access memory (RAM) or other volatile storage device 850 (referred to as memory), coupled to bus 815 for storing information and instructions to be executed by processor(s) 810. Main memory 850 also may be used for storing temporary variables or other intermediate information during execution of instructions by processor(s) 810. The system also comprises a read only memory (ROM) and/or static storage device 820 coupled to bus 815 for storing static information and instructions for processor(s) 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor(s) 810. An additional user input device is cursor control device 880, such as a touchpad, mouse, a trackball, stylus, or cursor direction keys coupled to bus 815 through bus 865 for communicating direction information and command selections to processor(s) 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read-only memory 820 and executed by processor(s) 810. This control logic or software may also be resident on an article of manufacture comprising a computer readable medium having computer readable program code embodied therein and being readable by the mass storage device 825 and for causing the processor(s) 810 to operate in accordance with the methods and teachings herein.

The embodiments discussed herein may also be embodied in a handheld or portable device containing a subset of the computer hardware components described above. For example, the handheld device may be configured to contain only the bus 815, the processor(s) 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include processor(s) 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer-implemented method of communication, comprising:

receiving, from a first user device of a first user, a request for an interactive communication, wherein the first user device is among one or more user devices and the first user is among one or more users;

in response to the request, obtaining communication information associated with the interactive communication, and initiating the interactive communication;

generating a digital transcript of the interactive communication based on the communication information, wherein the digital transcript comprises the communication information;

generating a web resource identifier that references the digital transcript; and sending the web resource identifier to the one or more user devices, wherein the digital transcript is accessible by the one or more users using the web resource identifier, and a visual representation of the web resource identifier is rendered on at least one of the one or more user devices.

2. The method of claim 1, further comprising: prior to obtaining the communication information associated with the interactive communication, and initiating the interactive communication, generating and providing one or more prompts to the first user device of the first user to obtain the communication information, wherein the first user provides the communication information via the first user device.

3. The method of claim 1, further comprising:

generating a dynamic image based on the communication information; and formatting the dynamic image into an image format.

4. The method of claim 3, further comprising:

uploading the digital transcript and the formatted dynamic image onto a web server.

5. The method of claim 3, wherein the image format is a scalable vector graphic (SVG) format or an open graph (OG) supported format.

6. The method of claim 1, wherein sending the web resource identifier to the one or more user devices comprises sending the web resource identifier to the one or more user devices during the interactive communication; and the digital transcript is accessible by the one or more users in real-time during the interactive communication.

7. The method of claim 6, wherein the visual representation of the web resource identifier is selectable by the first user, via the first user device, to access the digital transcript, and the digital transcript enables the first user to continue the interactive communication via the first user device.

8. The method of claim 1, wherein the digital transcript further comprises at least one of: a menu of options inviting the first user to make a selection, a message indicating a second user among the one or more users has connected with the first user in the interactive communication, a communication summary of the interactive communication, or updated information about the interactive communication.

9. The method of claim 1, wherein the communication information includes at least one of: one or more names of the one or more users, a name of a business, a purpose of the interactive communication, or date and time of the interactive communication.

10. The method of claim 1, wherein the digital transcript is updatable by the one or more users, via the one or more user devices, in real-time during the interactive communication or after completion of the interactive communication.

11. One or more non-transitory computer readable storage media having instructions stored thereupon which, when executed by a server system having at least a processor and a memory therein, cause the server system to perform operations, the operations comprising:

receiving, from a first user device of a first user, a request for an interactive communication, wherein the first user device is among one or more user devices and the first user is among one or more users;

in response to the request, obtaining communication information associated with the interactive communication, and initiating the interactive communication;

generating a digital transcript of the interactive communication based on the communication information, wherein the digital transcript comprises the communication information;

generating a web resource identifier that references the digital transcript; and sending the web resource identifier to the one or more user devices, wherein the digital transcript is accessible by the one or more users using the web resource identifier, and a visual representation of the web resource identifier is rendered on at least one of the one or more user devices.

12. The non-transitory computer readable storage media of claim 11, wherein the operations further comprise: prior to obtaining the communication information associated with the interactive communication, and initiating the interactive communication, generating and providing one or more prompts to the first user device of the first user to obtain the communication information, wherein the first user provides the communication information via the first user device.

13. The non-transitory computer readable storage media of claim 11, wherein the operations further comprise:

generating a dynamic image based on the communication information; and formatting the dynamic image into an image format.

14. The non-transitory computer readable storage media of claim 13, wherein the operations further comprise:

uploading the digital transcript and the formatted dynamic image onto a web server.

15. The non-transitory computer readable storage media of claim 11, wherein sending the web resource identifier to the one or more user devices comprises sending the web resource identifier to the one or more user devices during the interactive communication; and the digital transcript is accessible by the one or more users in real-time during the interactive communication.

16. The non-transitory computer readable storage media of claim 15, wherein the visual representation of the web resource identifier is selectable by the first user, via the first user device, to access the digital transcript, and the digital transcript enables the first user to continue the interactive communication via the first user device.

17. The non-transitory computer readable storage media of claim 11, wherein the digital transcript further comprises at least one of: a menu of options inviting the first user to make a selection, a message indicating a second user among the one or more users has connected with the first user in the interactive communication, a communication summary of the interactive communication, or updated information about the interactive communication.

18. The non-transitory computer readable storage media of claim 11, wherein the communication information includes at least one of: one or more names of the one or more users, a name of a business, a purpose of the interactive communication, or date and time of the interactive communication.

19. The non-transitory computer readable storage media of claim 11, wherein the digital transcript is updatable by the one or more users, via the one or more user devices, in real-time during the interactive communication or after completion of the interactive communication.

20. A server system, comprising:

a memory; and a processor coupled with the memory configured to perform operations comprising:

receiving, from a first user device of a first user, a request for an interactive communication, wherein the first user device is among one or more user devices and the first user is among one or more users;

in response to the request, obtaining communication information associated with the interactive communication, and initiating the interactive communication;

generating a digital transcript of the interactive communication based on the communication information, wherein the digital transcript comprises the communication information;

generating a web resource identifier that references the digital transcript; and sending the web resource identifier to the one or more user devices, wherein the digital transcript is accessible by the one or more users using the web resource identifier, and a visual representation of the web resource identifier is rendered on at least one of the one or more user devices.

* * * * *